United States Patent
Novoselov et al.

(10) Patent No.: US 9,772,488 B2
(45) Date of Patent: Sep. 26, 2017

(54) ELECTROWETTING DISPLAY PIXELS WITH PATTERNED ELECTRIC FIELD

(71) Applicant: Amazon Technologies, Inc., Seattle, WA (US)

(72) Inventors: Pavel Novoselov, Eindhoven (NL); Suki Sandhu, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/500,039

(22) Filed: Sep. 29, 2014

(65) Prior Publication Data

US 2016/0091710 A1    Mar. 31, 2016

(51) Int. Cl.
| | |
|---|---|
| G02B 26/00 | (2006.01) |
| G02F 1/03 | (2006.01) |
| G02F 1/29 | (2006.01) |
| G02F 1/133 | (2006.01) |
| G02F 1/01 | (2006.01) |

(52) U.S. Cl.
CPC ......... *G02B 26/005* (2013.01); *G02F 1/0105* (2013.01)

(58) Field of Classification Search
CPC ... G02F 1/133; G02F 1/29; G02F 1/01; G02F 1/03; G02F 1/15; G02F 1/155; G02F 1/153; G02B 5/23; G02B 26/00; G02B 26/08; G02B 1/06
USPC ........ 359/290–293, 295, 315–316, 276, 238, 359/245, 242, 259, 244, 253–254, 359/265–275, 665–667, 223–225, 243, 359/260–263; 349/33; 252/586
See application file for complete search history.

(56) References Cited

U.S. PATENT DOCUMENTS

| | | | |
|---|---|---|---|
| 2008/0130087 A1* | 6/2008 | Miyata | G09G 3/3433 359/267 |
| 2009/0027751 A1 | 1/2009 | Chen et al. | |
| 2010/0284056 A1 | 11/2010 | Giraldo | |
| 2010/0302615 A1* | 12/2010 | Aubert | G02B 26/004 359/290 |
| 2012/0262774 A1* | 10/2012 | Bae | G02B 26/005 359/290 |
| 2013/0222879 A1 | 8/2013 | Kuo et al. | |

(Continued)

FOREIGN PATENT DOCUMENTS

| | | |
|---|---|---|
| WO | WO2009071694 A2 | 6/2009 |
| WO | WO2013026877 A1 | 2/2013 |

OTHER PUBLICATIONS

PCT Search Report and Written Opinion mailed Dec. 14, 2015 for PCT Application No. PCT/US15/49804, 9 pages.

*Primary Examiner* — Dawayne A Pinkney
(74) *Attorney, Agent, or Firm* — Lee & Hayes, PLLC

(57) ABSTRACT

An electrowetting display comprises a support plate on which individual electrowetting pixels separated from one another by pixel walls are formed. The individual electrowetting pixels include a first conductive layer and a second conductive layer on the support plate. The first conductive layer and the second conductive layer are separated by a dielectric layer in first portions of the individual electrowetting pixels. The first conductive layer and the second conductive layer are in electrical contact with one another in second portions of the individual electrowetting pixels, wherein the second portions of the individual electrowetting pixels may be U-shaped.

18 Claims, 6 Drawing Sheets

(56) References Cited

U.S. PATENT DOCUMENTS

2013/0242367 A1    9/2013  Cho et al.
2013/0271817 A1*  10/2013  Jung ................... G02B 26/005
                                                             359/290

* cited by examiner

ELECTROWETTING DISPLAY PIXELS WITH PATTERNED ELECTRIC FIELD

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, finding ways to enhance user experience and satisfaction continues to be a priority. Moreover, increased multimedia use imposes high demands on designs, packaging, and fabricating display devices, as content available for mobile use becomes more extensive and device portability continues to be a high priority.

An electrowetting display includes an array of pixels individually bordered by pixel walls that retain liquid, such as opaque oil, for example. Light transmission through each pixel is adjustable by electronically controlling a position of the liquid in the pixel. Resolution and quality of an electrowetting display may depend on a number of factors, such as optical transmissivity or reflectivity of material layers of the electrowetting display and pixel size, just to name a few examples.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
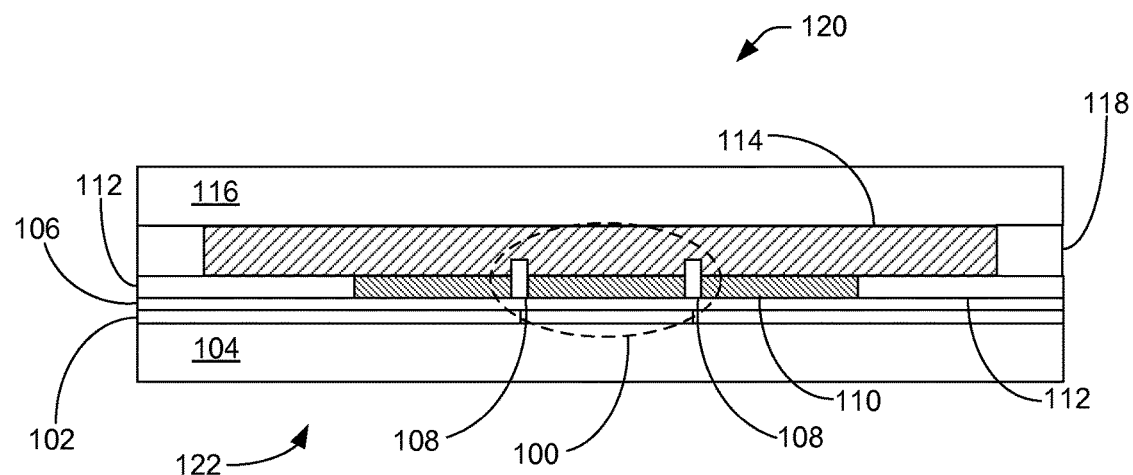
FIG. 1 illustrates a cross-section of a portion of an electrowetting display device, according to some embodiments.

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like. Various embodiments described herein include techniques for assembling electronic devices including these components for the electrowetting displays and other features described herein.

An electrowetting pixel may include one or more structures to form a patterned electric field. For example, a structure such as an L-shaped via or a U-shaped via may form a particularly high electric field gradient, which may initiate flow of a fluid if the electrowetting pixel enters into an active state. The fluid selectively covers or uncovers an area of the electrowetting pixel so that the electrowetting pixel is in either an inactive state or an active state. Accordingly, initiating flow of the fluid uncovers the electrowetting pixel and places the electrowetting pixel in an active state.

Though "vias" are typically holes etched in an interlayer dielectric layer and filled or coated with metal to interconnect layers, L-shaped or U-shaped vias (or vias having other shapes) of embodiments described herein may have relatively greater length/extent, may have several different sections or portions, and so on. For example, a U-shaped via may comprise a trench (e.g., as opposed to a hole of a typical via). Moreover, though U-shaped or L-shaped vias are described herein as having a "U" shape or an "L" shape, such shapes need not be precise and may include, for example, corners that are rounded or squared, and/or segments having different lengths, and so on.

A display device, such as an electrowetting display device, may be a transmissive, reflective or transflective display that generally includes an array of pixels (e.g., which may comprise subpixels) configured to be operated by an active matrix addressing scheme. For example, rows and columns of electrowetting pixels are operated by controlling voltage levels on a plurality of source lines and gate lines. In this fashion, the display device may produce an image by selecting particular pixels to transmit, reflect or block light. Pixels are addressed (e.g., selected) via rows and columns of the source lines and gate lines that are electrically connected to transistors (e.g., used as switches) included in each pixel. Transistors take up a relatively small fraction of the area of each pixel to allow light to efficiently pass through (or reflect from) the display pixel. Herein, a pixel may, unless otherwise specified, comprise a subpixel or pixel that includes two or more subpixels of an electrowetting display device. Such a pixel or subpixel may be the smallest light transmissive, reflective or transflective pixel of a display that is individually operable to directly control an amount of light transmission through or reflection from the pixel. For example, in some implementations, a pixel may comprise a red subpixel, a green subpixel, and a blue subpixel. In other implementations, a pixel may be a smallest component, e.g., the pixel does not include any subpixels.

Electrowetting displays include an array of pixels sandwiched between two support plates, such as a bottom support plate and a top support plate. For example, a bottom support plate in cooperation with a top support plate may contain pixels that include electrowetting oil, electrolyte solution and pixel walls between the support plates. Support plates may include glass, plastic (e.g., a transparent thermoplastic such as PMMA or other acrylic), or other transparent material and may be made of a rigid or flexible material, for example.

Pixels include various layers of materials built upon a bottom support plate. One such layer is a hydrophobic fluoropolymer (AF) upon which pixel walls are built.

Hereinafter, example embodiments include, but are not limited to, reflective electrowetting displays that include a clear top support plate and a bottom support plate, which need not be transparent. The clear top support plate may comprise glass or any of a number of transparent materials, such as plastic, quartz, semiconductors, and so on, and claimed subject matter is not limited in this respect. "Top" and "bottom", as used herein to identify the support plates of an electrowetting display, do not necessarily refer to a direction referenced to gravity or to a viewing side of the electrowetting display. Also, as used herein for sake of convenience of describing example embodiments, the top support plate is that through which viewing of pixels of a (reflective) electrowetting display occurs.

In some embodiments, a reflective electrowetting display comprises an array of pixels sandwiched between a bottom support plate and a top support plate. The bottom support plate may be opaque while the top support plate is transparent. Herein, describing a pixel or material as being "transparent" means that the pixel or material may transmit a relatively large fraction of the light incident upon it. For example, a transparent material or layer may transmit more than 70% or 80% of the light impinging on its surface, though claimed subject matter is not limited in this respect.

Pixel walls retain at least a first fluid which is electrically non-conductive, such as opaque or colored oil, in the individual pixels. A cavity formed between the support plates is filled with the first fluid (e.g., retained by pixel walls) and a second fluid (e.g., considered to be an electrolyte solution) that is electrically conductive or polar and may be a water or a salt solution such as a solution of potassium chloride water. The second fluid may be transparent, but may be colored, or light-absorbing. The second fluid is immiscible with the first fluid.

Individual reflective electrowetting pixels may include a reflective layer on the bottom support plate of the electrowetting pixel, a transparent electrode layer adjacent to the reflective layer, and a hydrophobic layer on the electrode layer. Pixel walls of each pixel, the hydrophobic layer, and the transparent top support plate at least partially enclose a liquid region that includes an electrolyte solution and an opaque liquid, which is immiscible with the electrolyte solution. An "opaque" liquid, as described herein, is used to describe a liquid that appears black to an observer. For example, an opaque liquid strongly absorbs a broad spectrum of wavelengths (e.g., including those of red, green and blue) in the visible region of electromagnetic radiation. In some implementations, the opaque liquid is a nonpolar electrowetting oil.

The opaque liquid is disposed in the liquid region. As described in detail below, coverage area of the opaque liquid on the bottom hydrophobic layer is electronically adjustable to affect the amount of light incident on the reflective electrowetting display that reaches the reflective material at the bottom of each pixel.

In addition to pixels, spacers and edge seals may also be located between two support plates. Support plates may comprise any of a number of materials, such as plastic, glass, quartz, semiconductors, and so on, and claimed subject matter is not limited in this respect.

Spacers and edge seals which mechanically connect a first support plate with a second overlying support plate, or which form a separation between the first support plate and the second support plate, contribute to mechanical integrity of the electrowetting display. Edge seals, for example, being disposed along a periphery of an array of electrowetting pixels, may contribute to retaining (e.g., first and second) fluids between the first support plate and the second overlying support plate. Spacers are desirably transparent so as to not hinder throughput of light in the electrowetting display. Transparency of spacers may at least partially depend on the refractive index of the spacer material, which should be similar to or the same as the refractive indices of surrounding media. Spacers are also desirably chemically inert to surrounding media.

In some embodiments, a display device as described herein may comprise a portion of a system that includes one or more processors and one or more computer memories, which may reside on a control board, for example. Display software may be stored on the one or more memories and may be operable with the one or more processors to modulate light that is received from an outside source (e.g., ambient room light) or out-coupled from a light guide of the display device. For example, display software may include code executable by a processor to modulate optical properties of individual pixels of the electrowetting display based, at least in part, on electronic signals representative of image or video data. The code may cause the processor to modulate the optical properties of pixels by controlling electrical signals (e.g., voltages, currents, fields, and so on) on, over, or in layers of the electrowetting display.

FIG. 1 is a cross-section of a portion of a reflective electrowetting display device illustrating several electrowetting pixels 100, according to some embodiments. Though three such electrowetting pixels are illustrated, an electrowetting display device may include any number (usually a very large number, such as thousands or millions) of electrowetting pixels. An electrode layer 102 is formed on a bottom support plate 104.

In various embodiments, electrode layer 102 may be connected to any number of thin film transistors (TFTs) that are switched to either select or deselect electrowetting pixels 100 using active matrix addressing, for example. A TFT is a particular type of field-effect transistor that includes thin films of an active semiconductor layer as well as a dielectric layer and metallic contacts over a supporting (but non-conducting) substrate, which may be glass or any of a number of other transparent or non-transparent materials, for example.

In some implementations, a dielectric barrier layer (not illustrated in FIG. 1) may at least partially separate electrode layer 102 from an AF layer 106 also formed on bottom support plate 104. Such separation may, among other things, prevent electrolysis occurring through AF layer 106. In some implementations, AF layer 106 may comprise any of a number of types of fluoropolymers, such as AF1600, produced by DuPont, based in Wilmington, Del. AF layer 106 may also be any of a number of materials that affect wettability of an adjacent material, for example.

Pixel walls 108 form a patterned electrowetting pixel grid on AF layer 106. Pixel walls 108 may comprise a photoresist material such as, for example, epoxy-based negative photoresist SU-8. The patterned electrowetting pixel grid comprises rows and columns that form an array of electrowetting pixels. For example, an electrowetting pixel may have a width and length in a range of about 50 to 500 microns.

A first fluid 110, which may have a thickness (e.g., depth) in a range of about 1 to 10 microns, for example, overlays AF layer 106. First fluid 110 is partitioned by pixel walls 108 of the patterned electrowetting pixel grid. An outer rim 112 may comprise the same material as pixel walls 108. A second fluid 114, such as an electrolyte solution, overlays first fluid 110 and pixel walls 108 of the patterned electrowetting pixel grid. An electrolyte solution may be electrically conductive and/or polar. For example, an electrolyte solution may be, among other things, a water solution or a salt solution such as potassium chloride water. First fluid 110 is immiscible with second fluid 114.

A support plate 116 covers second fluid 114 and edge seals 118 maintain second fluid 114 over the electrowetting pixel array. Support plate 116 may be supported by edge seals 118 and spacers (not illustrated) that extend up to support plate 116 and are interspersed throughout the array of pixels 100. The support plate may be made of glass or polymer and may be rigid or flexible, for example. In some implementations, TFTs are fabricated onto support plate 116.

A voltage applied across, among other things, second fluid 114 and electrode 102 of individual electrowetting pixels may control transmittance or reflectance of the individual electrowetting pixels.

The reflective electrowetting display device has a viewing side 120 on which an image formed by the electrowetting display device may be viewed, and a rear side 122. Support plate 116 faces viewing side 120 and bottom support plate 104 faces rear side 122. The reflective electrowetting display device may be a segmented display type in which the image is built up of segments. The segments may be switched simultaneously or separately. Each segment includes one electrowetting pixel 100 or a number of electrowetting pixels 100 that may be neighboring or distant from one another. Electrowetting pixels 100 included in one segment are switched simultaneously, for example. The electrowetting display device may also be an active matrix driven display type or a passive matrix driven display, just to name a few examples.

As mentioned above, second fluid 114 is immiscible with first fluid 110. Herein, substances are immiscible with one another if the substances do not substantially form a solution. Second fluid 114 is electrically conductive and/or polar, and may be water or a salt solution such as a solution of potassium chloride in a mixture of water and ethyl alcohol, for example. Second fluid 114 is preferably transparent, but may be colored or absorbing. First fluid 110 is electrically non-conductive and may for instance be an alkane like hexadecane or (silicone) oil.

AF layer 106 is arranged on bottom support plate 104 to create an electrowetting surface area. The hydrophobic character causes first fluid 110 to adhere preferentially to AF layer 106 since first fluid 110 has a higher wettability with respect to the surface of AF layer 106 than second fluid 114 in the absence of a voltage. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability of more than 90° to complete wettability at 0°, in which case the fluid tends to form a film on the surface of the solid.

First fluid 110 absorbs at least a part of the optical spectrum. First fluid 110 may be transmissive for a part of the optical spectrum, forming a color filter. For this purpose, the fluid may be colored by addition of pigment particles or dye, for example. Alternatively, first fluid 110 may be black (e.g., absorbing substantially all parts of the optical spectrum) or reflecting. Hydrophobic layer 106 may be transparent or reflective. A reflective layer may reflect the entire visible spectrum, making the layer appear white, or part of it, making it have a color.

If a voltage is applied across electrowetting pixel 100, electrowetting pixel 100 will enter into an active state. Electrostatic forces will move second fluid 114 toward electrode layer 102, thereby displacing first fluid 110 from the area of AF layer 106 to pixel walls 108 surrounding the area of AF layer 106, to a droplet-like form. Such displacing action uncovers first fluid 110 from the surface of AF layer 106 of electrowetting pixel 100. Such displacing action may be affected by a patterned electric field. For example, displacement of fluid may begin in or near a region having a particularly high electric field gradient, which may be formed by a via having an L-shape, a U-shape, a square shape, or a rectangular shape (not shown in FIG. 1) under AF layer 106 in electrowetting pixel 100. In some example embodiments, electrowetting pixels 100 may, in a plan view, have a square shape or a rectangular shape. Vias in electrowetting pixels 100 having such shapes may have shapes that follow at least a portion of the outline of electrowetting pixels 100. Thus, for example, a square-shaped via may be incorporated in a square-shaped electrowetting pixel. Example embodiments herein are directed mostly to vias having an L-shape, though claimed subject matter is not so limited.

If the voltage across electrowetting pixel 100 is returned to an inactive signal level of zero or a value near to zero, electrowetting pixel 100 will return to an inactive state, where first fluid 110 flows back to cover AF layer 106. In this way, first fluid 110 forms an electrically controllable optical switch in each electrowetting pixel 100. Of course, such details of an electrowetting display device are merely examples, and claimed subject matter is not limited in this respect.

Figure 2:
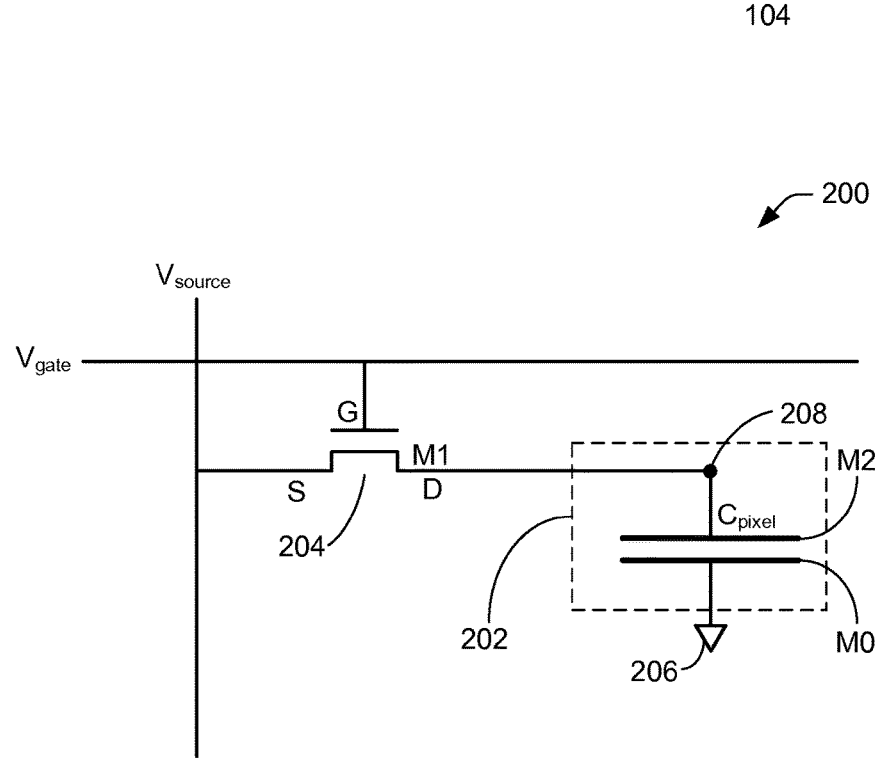
FIG. 2 is a schematic diagram of an electronic circuit representative of a pixel of a display device, according to various embodiments.

FIG. 2 is a schematic diagram of an electronic circuit 200 representative of pixel 202 of a reflective electrowetting display device, according to various embodiments. For example, pixel 202 may be the same as or similar to electrowetting pixel 100, illustrated in FIG. 1. The reflective electrowetting display device includes an array of rows and columns of such pixels. The reflective electrowetting display device also includes rows of gate lines and columns of source lines that are connected to TFTs of individual pixels. For example, TFT 204 is connected to a gate line $V_{gate}$ and a source line $V_{source}$ and acts as a switch to select or deselect pixel 202. In particular, gate line $V_{gate}$ is connected to the gate of TFT 204 and a source line $V_{source}$ is connected to the source of TFT 204. The drain of TFT 204 is connected to pixel 202. Pixel 202 includes capacitance $C_{pixel}$, which represents a capacitance formed by a multiple dielectric layer stack between two electrodes (not shown in FIG. 2) of pixel 202.

Pixel 202 may include three conductive layers which may, for example, be metal or a conductive semiconductor material. The three conductive layers are referred to as M0, M1, and M2, respectively. M0 may comprise a conductive layer in electrical connection with a top support plate (e.g., 116, shown in FIG. 1) of pixel 202. M1 may comprise a first conductive layer in a bottom support plate (e.g., 104, shown in FIG. 1) of pixel 202, and M2 may comprise a second conductive layer in the bottom support plate. M0 may be connected to a potential ground 206 of the reflective electrowetting display device. M1 may be connected to the drain of TFT 204. M2 may comprise a reflective layer such as, for example, electrode layer 102 (illustrated in FIG. 1) connected to TFT 204. In some example embodiments, M2 may comprise a reflective layer (e.g., a metal) disposed on an ITO layer.

An electrical junction or interface between M1 (e.g., the drain of TFT 204) and M2 may comprise a U-shaped via where M1 and M2 are electrically interconnected with one another, as explained in detail below.

Figure 3:
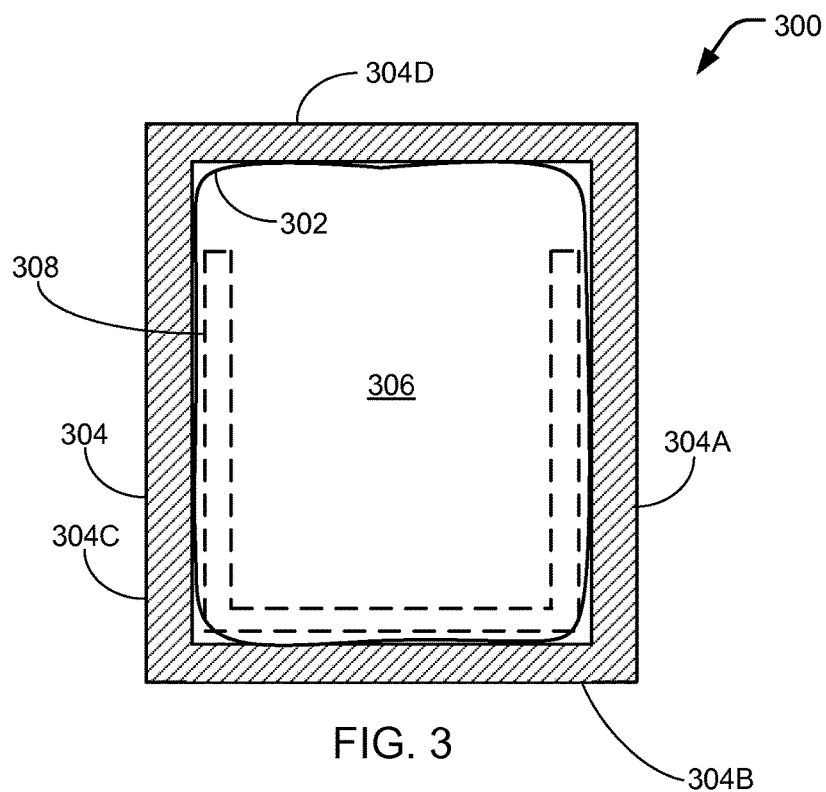
FIG. 3 illustrates a top view of an electrowetting pixel mostly covered with an electrowetting fluid, according to some embodiments.

FIG. 3 illustrates a top view of an electrowetting pixel 300 in an inactive state if the pixel is substantially covered with an electrowetting fluid 302, according to some embodiments. For example, electrowetting fluid 302 may comprise an opaque oil. Pixel 300 includes pixel walls 304 surrounding a pixel region 306. Pixel walls 304 present a peripheral boundary to electrowetting fluid 302. Though not shown in FIG. 3, electrowetting pixel 300 includes another electrowetting fluid overlying electrowetting fluid 302 and pixel walls 304. For example, while electrowetting fluid 302 may comprise an oil, the overlying electrowetting fluid may comprise an electrolyte solution.

A portion of pixel region 306 includes a U-shaped via trench 308, hereinafter called a "U-shaped via". U-shaped via 308 may provide a number of functions. For example, U-shaped via 308 may be configured to electrically interconnect a first conductive layer (e.g. M1) and a second conductive layer (e.g., M2) of pixel 300. Thus, U-shaped via 308 may be a structure to provide transfer of electronic signals between the first conductive layer and the second conductive layer (e.g., between M1 and M2). In another example, U-shaped via 308 may lead to relatively high electric field gradients along an extended length, which may be used to initiate flow of electrowetting fluid 302 during a transition of pixel 300 from an inactive state to an active state. Such an extended length (e.g., the U-shape) may give rise to a patterned electric field (e.g., a U-shaped electric field pattern). In some embodiments, an L-shaped via or a linear, elongate via may replace U-shaped via 308. For example, U-shaped via 308 is located along three of the four pixel walls 304, namely, 304A, 304B, and 304C. On the other hand, an L-shaped via may be located along two of the four pixel walls 304, namely 304A and 304B, or 304B and 304C.

Figure 4:
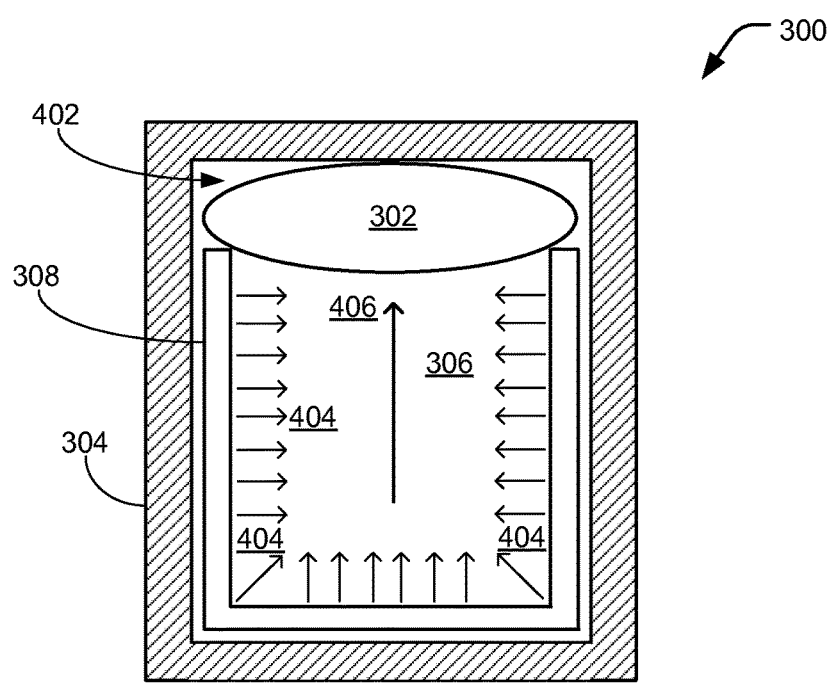
FIG. 4 illustrates a top view of an electrowetting pixel mostly exposed by an electrowetting fluid, according to some embodiments.

FIG. 4 illustrates a top view of electrowetting pixel 300 in an active state if a reflective layer (e.g., conductor M2) in pixel region 306 is substantially exposed by electrowetting fluid 302, according to some embodiments. In this case, electrowetting fluid 302 may be displaced by the overlying electrolyte solution so that electrowetting fluid 302 collects as a bead toward an end region 402 of pixel region 306. To place electrowetting pixel 300 into an active state, an electrical charge is placed on U-shaped via 308 to create an electric field. In particular, electrical charge may be placed on substantially the entire pixel region 306. But because of the configuration of U-shaped via 308, electrical charge on the U-shaped via gives rise to an electric field gradient that is greatest along edges of U-shaped via 308, as compared to remaining portions of pixel region 306. Accordingly, the overlying electrolyte solution is attracted with the greatest force (e.g., due at least in part to the hydrophobicity of an AF layer (e.g., 106 in FIG. 1)) toward U-shaped via 308. As a result, electrowetting fluid 302 is displaced away from this region, as indicated by arrows 404. This local displacement leads to a global displacement of electrowetting fluid 302 being "pushed" toward end region 402, as indicated by arrow 406. For example, such a pushing or displacing action may be performed by a second electrowetting fluid immiscible with electrowetting fluid 302. In a particular example, electrowetting fluid 302 may be an opaque oil and the second electrowetting fluid may be an electrolyte solution.

Figure 5:
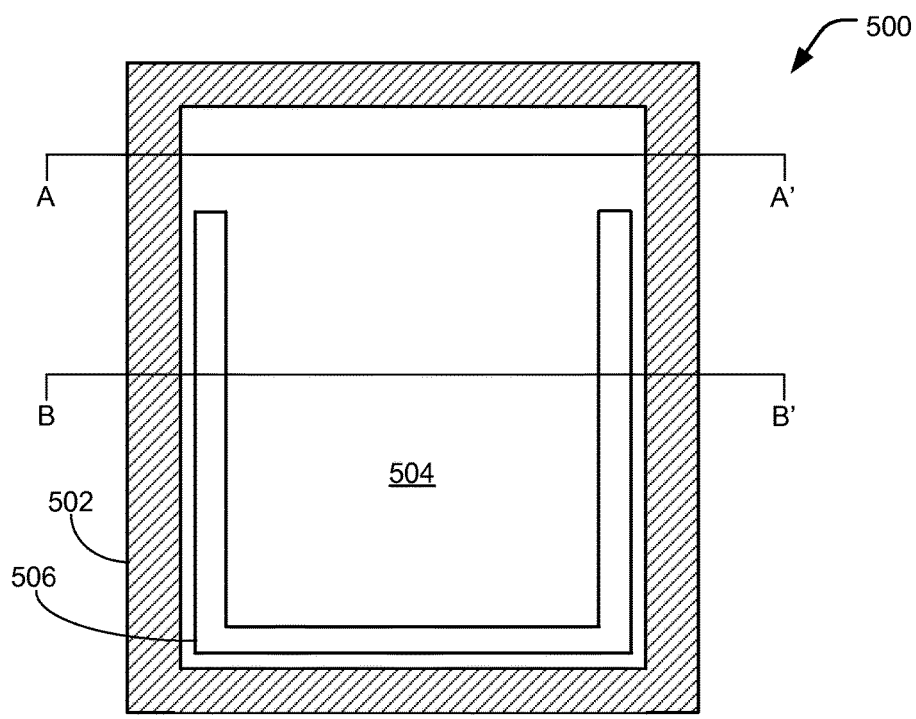
FIG. 5 illustrates a top view of an electrowetting pixel, according to some embodiments.

FIG. 5 illustrates a top view of a portion of an electrowetting pixel 500 sans an electrowetting fluid, according to some embodiments. For example, electrowetting pixel 500 may be similar to or the same as reflective electrowetting pixel 300 illustrated in FIG. 3. An electrowetting fluid is absent in FIG. 5 for sake of clarity.

Pixel 500 includes pixel walls 502 surrounding a pixel region 504. Pixel walls 502 present a peripheral boundary to an electrowetting fluid, such as electrowetting fluid 302 illustrated in FIG. 3. A portion of pixel region 504 includes a U-shaped via 506 covered with an AF layer (e.g., AF layer 106). A remaining portion of pixel region 504 comprises a substantially flat surface that is also covered with the AF layer. U-shaped via 506 may be a depression or trench that "interrupts" the otherwise substantially flat surface of pixel region 504. Cross-section views located along lines A-A' and B-B' are described below.

Figure 6:
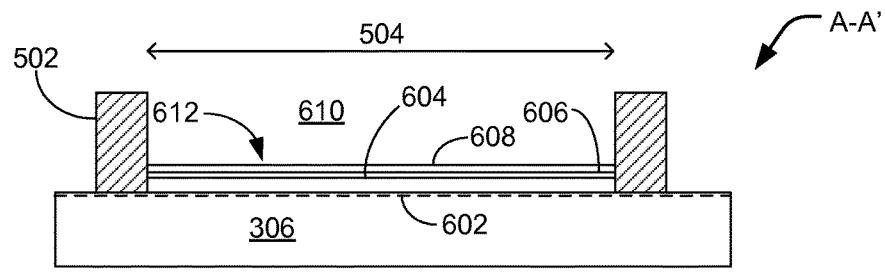
FIGS. 6 and 7 illustrate cross-section views of an electrowetting pixel, according to some embodiments.

FIG. 6 illustrates a cross-section view of electrowetting pixel 500 along line A-A', according to some embodiments. Pixel region 504 may be substantially flat and includes, among other things, a first conductive layer 602, a first dielectric layer 604, a second conductive layer 606, a second dielectric layer (not shown in FIG. 6), and an AF layer 608 at least partially covering the second dielectric layer. For a particular example, first dielectric layer 604 may comprise SiN and may have a thickness in a range from about 100 nanometers up to about 200 nanometers. For another particular example, first conductive layer 602 and second conductive layer 606 may be the same as or similar to M1 and M2, respectively, illustrated in FIG. 2. Thicknesses of first conductive layer 602 and second conductive layer 606 may be in a range from about 200 nanometers up to about 300 nanometers. An electrowetting fluid 610, which may comprise one or more different fluids that are immiscible with one another, covers the stack of conductors and dielectrics 602-606 and AF layer 608. The surface, at which arrow 612 points, of second conductive layer 606 is configured to receive light that may impinge on electrowetting pixel 500. AF layer 608 is substantially transparent.

Figure 7:
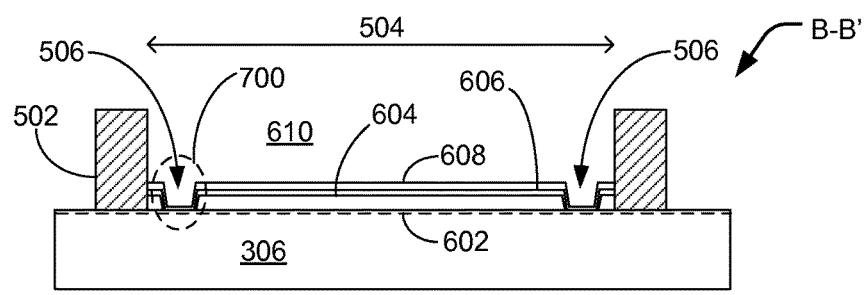

FIG. 7 illustrates a cross-section view of electrowetting pixel 500 along line B-B', according to some embodiments. FIG. 7 illustrates a portion of pixel region 504 that includes trenches 506. Trenches 506 (illustrated in the right portion and left portion of pixel region 504) may be portions of a single U-shaped via, as illustrated in FIG. 5. In some embodiments, however, trenches 506 need not be continuous and may include two or more separated sections.

The stack of conductors and dielectrics 602-606 and AF layer 608 are substantially flat in the pixel region between the right and left portions of U-shaped via 506. A region 700 is shown in close-up detail in FIG. 8.

Figure 8:
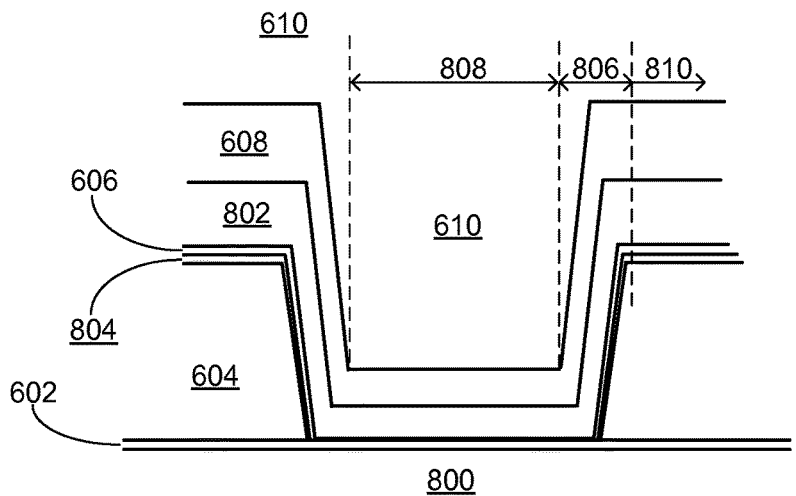
FIG. 8 illustrates a detailed cross-section view of an electrowetting pixel, according to some embodiments.

FIG. 8 illustrates a detailed cross-section view of region 700 of electrowetting pixel 500, illustrated in FIG. 7, according to some embodiments. In particular, region 700 includes a portion of U-shaped via 506 formed on a support plate 800, which may be the same as or similar bottom support plate 104 illustrated in FIG. 1. First conductive layer 602, first dielectric layer 604, second conductive layer 606, a second dielectric layer 802, and AF layer 608 are formed on support plate 800. For a particular example, second dielectric layer 802 may comprise SiN and may have a thickness in the range from about 100 nanometers up to about 400 nanometers. Additionally, a transparent conductive layer 804 may be disposed adjacent to at least some portions of second conductive layer 606. For a particular example, transparent conductive layer 804 may comprise indium tin oxide (ITO) and may have a thickness in a range from about 50 nanometers up to about 100 nanometers.

Two regions of U-shaped via 506 may be identified as a transition region 806 and a bottom region 808. Transition region 806 may include first conductive layer 602, first dielectric layer 604, second conductive layer 606, second dielectric layer 802, AF layer 608, and ITO layer 804. On the other hand, bottom region 808 may include first conductive layer 602, second conductive layer 606, second dielectric layer 802, AF layer 608, and ITO layer 804. In other words, first dielectric layer 604 need not be present in bottom region 808. Accordingly, first conductive layer 602 and second conductive layer 606 are in electrical contact with one another in bottom region. Referring to electronic circuit 200 representative of pixel 202, first conductive layer 602 may be the same as or similar to M1 and second conductive layer 606 may be the same as or similar to M2.

In some embodiments, second dielectric layer 802 may be relatively thin compared to a thickness of second dielectric layer 802 in transition region 806. Moreover, second dielectric layer 802 in transition region 806 may be relatively thin compared to a thickness of second dielectric layer 802 in non-via region 810. As described above, electrical charge placed on first and/or second conductive layers 602 and 606 may give rise to electric fields. Gradients of such electric fields may depend, at least in part, on distance between first and/or second conductive layers 602 and 606, which may be determined by a thickness of second dielectric layer 802. Accordingly, electric field gradients are relatively high in bottom region 808 and transition region 806 compared to that of non-via region 810. Such high electric field gradients may initiate flow of electrowetting fluid 610 if electrowetting pixel 500 enters into an active state. Electrowetting fluid 610 may comprise an oil and/or an electrolyte solution. For example, applying voltage across portions of electrowetting pixel 500 (e.g., from M2 to M0, as illustrated in FIG. 2) may affect flow of oil that either (partially) covers or uncovers pixel region 504 so that electrowetting pixel 500 is either inactive or active. Initiating flow of fluid 610 uncovers a relatively large portion of pixel region 504 from the oil and places the electrowetting pixel in an active state.

If thickness of second dielectric layer 802 is called "d", and "V" is a voltage created by an electrical charge placed on portions of electrowetting pixel 500 (e.g., from M2 to M0), then a force F that may act on the oil (or fluid 610) may be expressed as F~V/d, where "~" means "proportional to". As a thickness d of second dielectric layer 802 decreases, the force F correspondingly increases. Accordingly, a via or trench configuration may lead to relatively large forces that act to displace electrowetting fluids.

Figure 9:
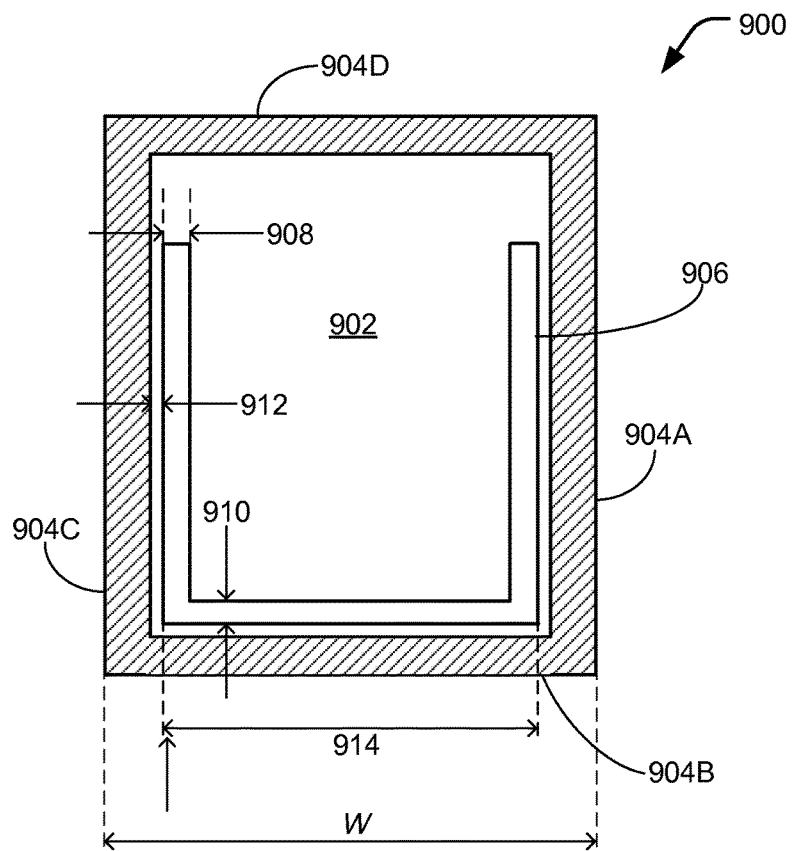
FIG. 9 illustrates a top view of an electrowetting pixel, according to some embodiments.

FIG. 9 illustrates a top view of an electrowetting pixel 900, according to some embodiments. For example, electrowetting pixel 900 may be similar to or the same as electrowetting pixel 500 illustrated in FIGS. 5-8. Electrowetting pixel 900 includes a pixel region 902 surrounded by pixel walls 904A-D, which may be continuous around the perimeter of pixel region 902 but may be identified as having four walls 904A, 904B, 904C, and 904D. Each such pixel wall may be shared by an adjacent electrowetting pixel (not shown).

A U-shaped via 906 may be substantially adjacent to three of the four pixel walls (e.g., 904A, 904B, and 904C). Width 908 of portions of U-shaped via 906 adjacent to pixel walls 904A and 904C may be in a range from about 2% up to about 20% of the width W of electrowetting pixel 900. For example, an electrowetting pixel may have a width and length in a range of about 50 to 500 microns. Width 910 of portions of U-shaped via 906 adjacent to pixel wall 904B may be in a range from about 2% up to about 50% of width W. A distance 912 between pixel walls 904A-C and U-shaped via 906 may be in a range from zero to about 10% or 20% of width W. Outside width 914 of U-shaped via 906 may be in a range from about 60% up to 100% of width W.

Figure 10:
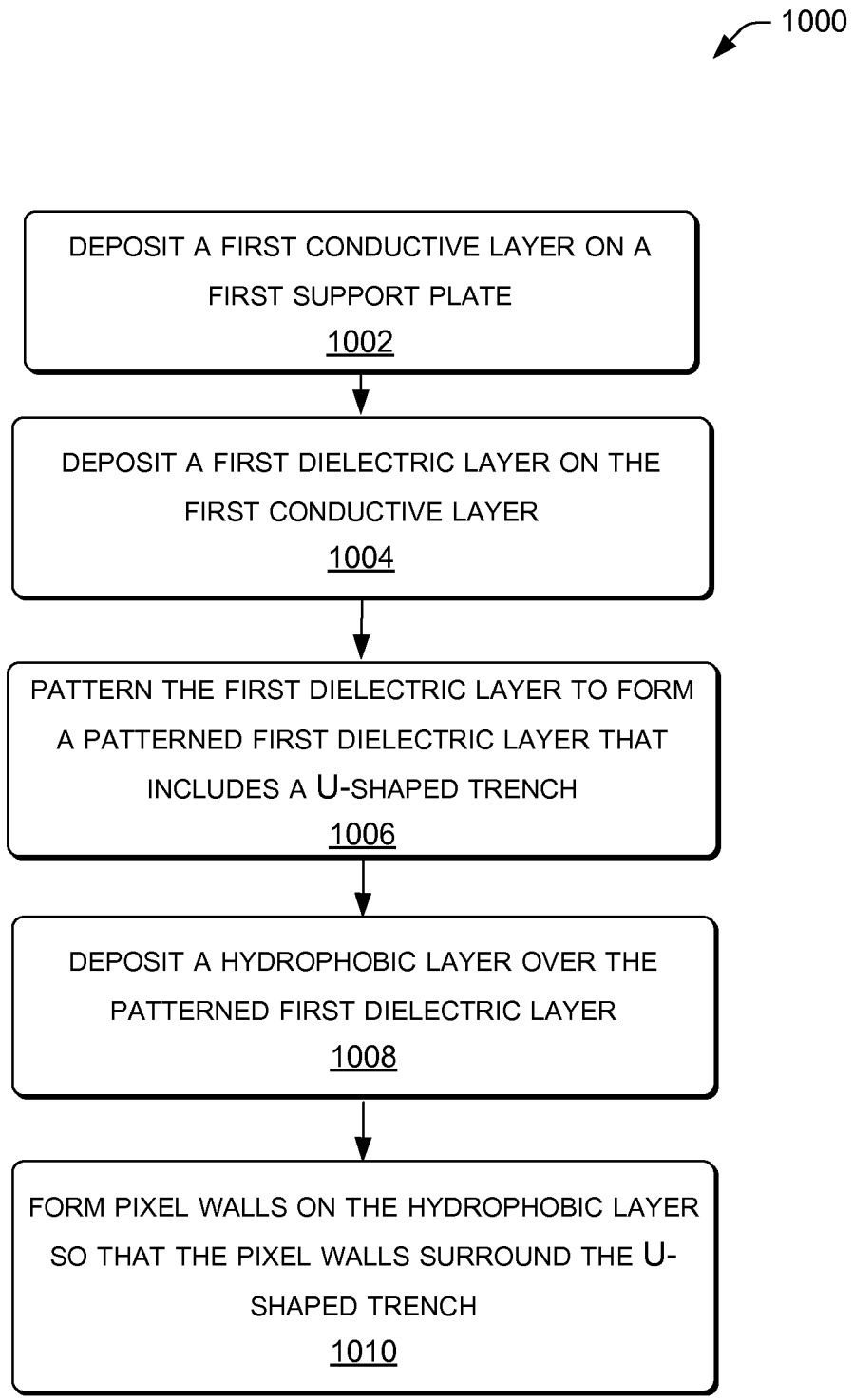
FIG. 10 is a flow diagram of a process for fabricating an electrowetting display device, according to various example embodiments.

FIG. 10 is a flow diagram of a process 1000 for fabricating an electrowetting display device, according to various embodiments. For example, the display device may be the same as or similar to the display device illustrated in FIG. 1. Though claimed subject matter is not limited in this respect, process 1000 may be performed manually (e.g., by humans) and/or automatic equipment. At block 1002, a first conductive layer is deposited on a first support plate. For example, the first conductive layer may be M1 illustrated in FIG. 2 or first conductive layer 602 illustrated in FIG. 6. The first conductive layer may be a metal such as tin, copper, gold, or an alloy of such metals, for example. Deposition techniques include, for example, chemical vapor deposition (CVD), physical vapor deposition (PVD), molecular beam epitaxy (MBE), sputtering, and so on. A first support plate may be the same as or similar to support plate 104 illustrated in FIG. 1.

At block 1004, a first dielectric layer (e.g., 604, illustrated in FIG. 6) is deposited on the first conductive layer. The first dielectric layer may comprise SiN, SiON, SiO, or TaO, just to name a few examples. Any of a number of deposition techniques may be used, such as CVD, PVD, MBE, and sputtering, for example. At block 1006, the first dielectric layer may be patterned to form a patterned first dielectric layer that includes a U-shaped trench, such as U-shaped via 506 illustrated in FIG. 5. For example, a lithographic process incorporating a pattern mask may be used to form the patterned first dielectric layer. The pattern mask may include patterns for etching U-shaped trenches. In some implementations, an etching process may produce an L-shape having rounded corners or other features resulting from any imprecise rendering of the L-shaped trench from the L-shaped pattern mask. At block 1008, a hydrophobic layer (e.g., AF layer 106, illustrated in FIG. 1) may be deposited over the patterned first dielectric layer. At block 1010, pixel walls may be formed on the hydrophobic layer so that the pixel walls surround the U-shaped trench. In some implementations, the pixel walls may be formed by depositing a photoresist material on the hydrophobic layer and subsequently etching the photoresist material with a pattern configured to form the pixel walls. The photoresist material may comprise, for example, epoxy-based negative photoresist SU-8.

Figure 11:
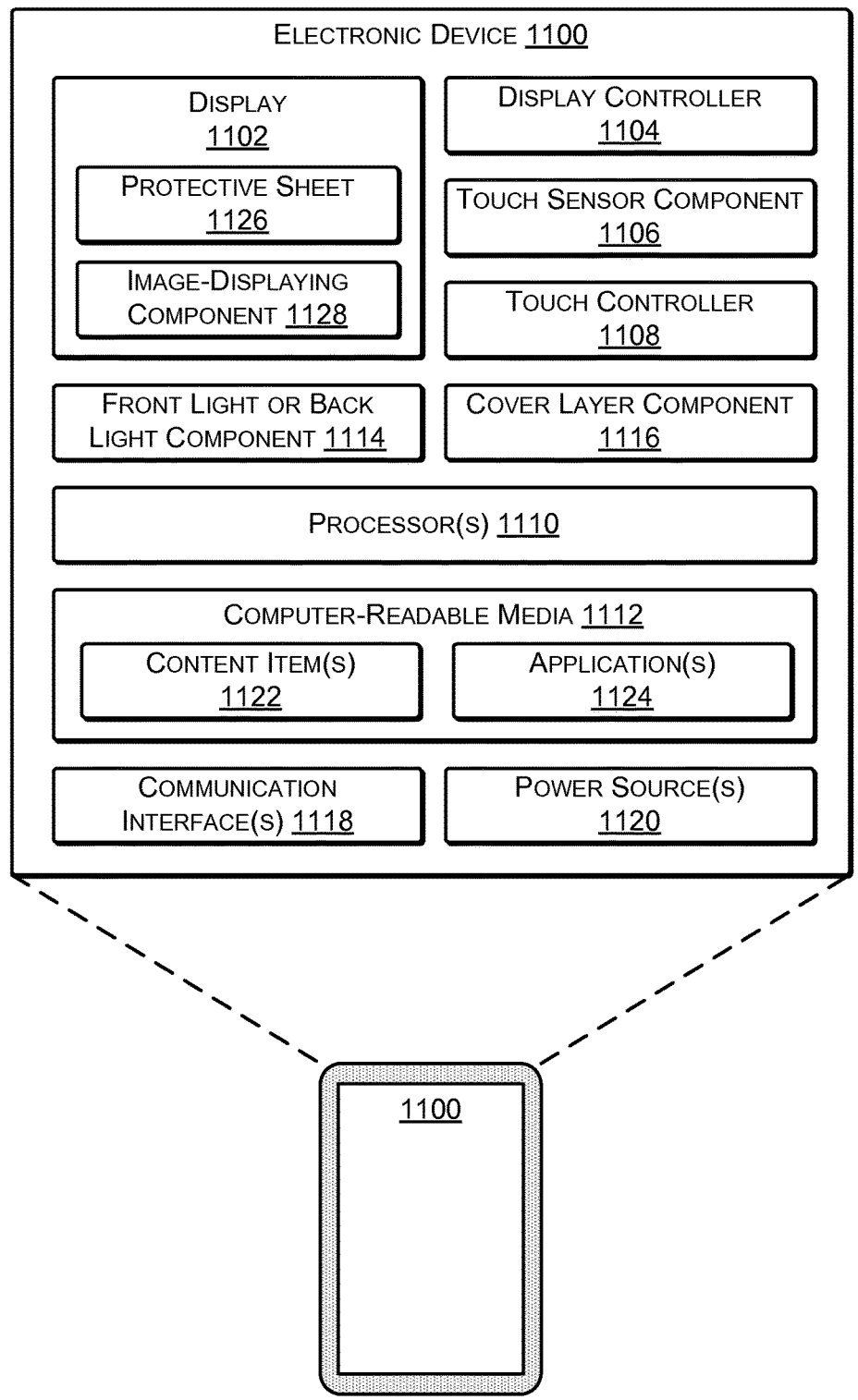
FIG. 11 illustrates an example electronic device that may incorporate a display device, according to some embodiments.

FIG. 11 illustrates an example electronic device 1100 that may incorporate any of the display devices discussed above. The device 1100 may comprise any type of electronic device having a display. For instance, the device 1100 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 1100 may be a non-mobile electronic device (e.g., a computer display, a television, etc.). In addition, while FIG. 11 illustrates several example components of the electronic device 1100, it is to be appreciated that the device 1100 may also include other conventional components, such as an operating system, system busses, input/output components, and the like. Further, in other examples, such as in the case of a television or computer monitor, the electronic device 1100 may only include a subset of the components illustrated.

Regardless of the specific implementation of the electronic device 1100, the device 1100 includes a display 1102 and a corresponding display controller 1104. The display 1102 may represent a reflective or transmissive display in some instances.

In an implementation, the display comprises an electrowetting display that employs an applied voltage to change the surface tension of a fluid in relation to a surface. For example, such an electrowetting display may include the array of pixels 110 illustrated in FIG. 1, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by contracting a colored oil film if a voltage is applied to individual pixels of the display. If the voltage is absent, the colored oil forms a continuous film within a pixel, and the color may thus be visible to a user of the display. On the other hand, if the voltage is applied to the pixel, the colored oil is displaced and the pixel becomes transparent. If multiple pixels of the display are independently activated, the display may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 1102 may represent a backlit display, examples of which are mentioned above.

In addition to including the display 1102, FIG. 11 illustrates that some examples of the device 1100 may include a touch sensor component 1106 and a touch controller 1108. In some instances, at least one touch sensor component 1106 resides with, or is stacked on, the display 1102 to form a touch-sensitive display. Thus, the display 1102 may be capable of both accepting user touch input and rendering content in response to or corresponding to the touch input. As several examples, the touch sensor component 1106 may comprise a capacitive touch sensor, a force sensitive resistance (FSR), an interpolating force sensitive resistance (IFSR) sensor, or any other type of touch sensor. In some instances, the touch sensor component 1106 is capable of detecting touches as well as determining an amount of pressure or force of these touches.

FIG. 11 further illustrates that the electronic device 1100 may include one or more processors 1110 and one or more computer-readable media 1112, as well as a front light component 1114 (which may alternatively be a backlight component in the case of a backlit display) for lighting the display 1102, a cover layer component 1116, such as a cover glass or cover sheet, one or more communication interfaces 1118 and one or more power sources 1120. The communication interfaces 1118 may support both wired and wireless connection to various networks, such as cellular networks, radio, WiFi networks, short range networks (e.g., Bluetooth®), infrared (IR), and so forth.

Depending on the configuration of the electronic device 1100, the computer-readable media 1112 (and other computer-readable media described throughout) is an example of computer storage media and may include volatile and non-volatile memory. Thus, the computer-readable media 1112 may include, but is not limited to, RAM, ROM, EEPROM, flash memory, or other memory technology, or any other medium that may be used to store computer-readable instructions, programs, applications, media items, and/or data which may be accessed by the electronic device 1100.

The computer-readable media 1112 may be used to store any number of functional components that are executable on the processor 1110, as well as content items 1122 and applications 1124. Thus, the computer-readable media 1112 may include an operating system and a storage database to store one or more content items 1122, such as eBooks, audio books, songs, videos, still images, and the like. The computer-readable media 1112 of the electronic device 1100 may also store one or more content presentation applications to render content items on the device 1100. These content presentation applications may be implemented as various applications 1124 depending upon the content items 1122. For instance, the content presentation application may be an electronic book reader application for rending textual electronic books, an audio player for playing audio books or songs, a video player for playing video, and so forth.

In some instances, the electronic device 1100 may couple to a cover (not illustrated in FIG. 11) to protect the display (and other components in the display stack or display assembly) of the device 1100. In one example, the cover may include a back flap that covers a back portion of the device 1100 and a front flap that covers the display 1102 and the other components in the stack. The device 1100 and/or the cover may include a sensor (e.g., a Hall effect sensor) to detect if the cover is open (i.e., if the front flap is not atop the display and other components). The sensor may send a signal to the front light component 1114 if the cover is open and, in response, the front light component 1114 may illuminate the display 1102. If the cover is closed, meanwhile, the front light component 1114 may receive a signal indicating that the cover has closed and, in response, the front light component 1114 may turn off.

Furthermore, the amount of light emitted by the front light component 1114 may vary. For instance, upon a user opening the cover, the light from the front light may gradually increase to its full illumination. In some instances, the device 1100 includes an ambient light sensor (not illustrated in FIG. 11) and the amount of illumination of the front light component 1114 may be based at least in part on the amount of ambient light detected by the ambient light sensor. For example, the front light component 1114 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 1102 may vary depending on whether the front light component 1114 is on or off, or based on the amount of light provided by the front light component 1114. For instance, the electronic device 1100 may implement a larger default font or a greater contrast if the light is off compared to if the light is on. In some instances, the electronic device 1100 maintains, if the light is on, a contrast ratio for the display that is within a certain defined percentage of the contrast ratio if the light is off.

As described above, the touch sensor component 1106 may comprise a capacitive touch sensor that resides atop the display 1102. In some examples, the touch sensor component 1106 may be formed on or integrated with the cover layer component 1116. In other examples, the touch sensor component 1106 may be a separate component in the stack of the display assembly. The front light component 1114 may reside atop or below the touch sensor component 1106. In some instances, either the touch sensor component 1106 or the front light component 1114 is coupled to a top surface of a protective sheet 1126 of the display 1102. As one example, the front light component 1114 may include a lightguide sheet and a light source (not illustrated in FIG. 11). The lightguide sheet may comprise a substrate (e.g., a transparent thermoplastic such as PMMA or other acrylic), a layer of lacquer and multiple grating elements formed in the layer of lacquer that function to propagate light from the light source towards the display 1102, thus illuminating the display 1102.

The cover layer component 1116 may include a transparent substrate or sheet having an outer layer that functions to reduce at least one of glare or reflection of ambient light incident on the electronic device 1100. In some instances, the cover layer component 1116 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3 h pencil). Without such scratch resistance, a device may be more easily scratched and a user may perceive the scratches from the light that is dispersed over the top of the reflective display. In some examples, the protective sheet 1126 may include a similar UV-cured hard coating on the outer surface. The cover layer component 1116 may couple to another component or to the protective sheet 1126 of the display 1102. The cover layer component 1116 may, in some instances, also include a UV filter, a UV-absorbing dye, or the like, for protecting components lower in the stack from UV light incident on the electronic device 1100. In still other examples, the cover layer component 1116 may include a sheet of high-strength glass having an antiglare and/or antireflective coating.

The display 1102 includes the protective sheet 1126 overlying an image-displaying component 1128. For example, the display 1102 may be preassembled to have the protective sheet 1126 as an outer surface on the upper or image-viewing side of the display 1102. Accordingly, the protective sheet 1126 may be integral with and may overlay the image-displaying component 1128. The protective sheet 1126 may be optically transparent to enable a user to view, through the protective sheet 1126, an image presented on the image-displaying component 1128 of the display 1102.

In some examples, the protective sheet 1126 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 1126 may include a coating, such as the hard coating described above. For instance, the hard coating may be applied to the outer surface of the protective sheet 1126 before or after assembly of the protective sheet 1126 with the image-displaying component 1128 of the display 1102. In some examples, the hard coating may include a photoinitiator or other reactive species in its composition, such as for curing the hard coating on the protective sheet 1126. Furthermore, in some examples, the protective sheet 1126 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 1126, thereby protecting the image-displaying component 1128 from UV light.

According to some implementations herein, one or more of the components discussed above may be coupled to the display 1102 using fluid optically-clear adhesive (LOCA). For example, suppose that the light guide portion of the front light component 1114 is to be coupled to the display 1102. The light guide may be coupled to the display 1102 by placing the LOCA on the outer or upper surface of the protective sheet 1126. If the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 1114 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 1114. In other implementations, the LOCA may be placed near a center of the protective sheet 1126, and pressed outwards towards a perimeter of the top surface of the protective sheet 1126 by placing the front light component 1114 on top of the LOCA. The LOCA may then be cured by directing UV light through the front light component 1114. As discussed above, and as discussed additionally below, various techniques, such as surface treatment of the protective sheet, may be used to prevent discoloration of the LOCA and/or the protective sheet 1126.

While FIG. 11 illustrates a few example components, the electronic device 1100 may have additional features or functionality. For example, the device 1100 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within the device 1100 may reside remotely from the device 1100 in some implementations. In these implementations, the device 1100 may utilize the communication interfaces 1118 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device comprising:
   a support plate having rows and columns of pixel walls, the rows and columns of pixel walls defining individual electrowetting pixel regions that are rectangular in a plan view;
   wherein each individual electrowetting pixel region includes:
      a first metal layer portion disposed on a portion of the support plate;
      a first dielectric layer portion disposed on the first metal layer portion;
      a second metal layer portion disposed on the first dielectric layer portion;
      a second dielectric layer portion disposed on the second metal layer portion;
      a first fluid;
      a second fluid that is immiscible with the first fluid; and
      a trench that is U-shaped in the plan view, wherein the first metal layer portion and the second metal layer portion are electrically interconnected at a bottom portion of the trench, wherein the second dielectric layer portion has a first thickness in the bottom portion of the trench and has a second thickness greater than the first thickness in a portion of the electrowetting pixel region outside the trench, and wherein at least a portion of the trench extends along one or more of the pixel walls of the individual electrowetting pixel.

2. The electrowetting display device of claim 1, wherein each individual electrowetting pixel region further includes:
   a hydrophobic layer portion at least partially covering the second dielectric layer portion and disposed on sides and a bottom of the trench.

3. The electrowetting display device of claim 1, wherein the second metal layer portion has a reflectivity configured to reflect light impinging on the reflective electrowetting display device.

4. An electrowetting display comprising:
   a support plate;
   electrowetting pixels separated from one another by pixel walls, wherein each electrowetting pixel has a rectangular area in a top view of the electrowetting pixel and includes:
      a trench that is at least partly substantially adjacent to at least one of the pixel walls;
      a first conductive layer portion and a second conductive layer portion, the second conductive layer portion being in electrical contact with the first conductive layer portion in at least a region of the electrowetting pixel that is outside of the trench, wherein the first conductive layer portion and the second conductive layer portion are physically separated by a dielectric layer portion in the region of the electrowetting pixel that is outside of the trench, and the first conductive layer portion and the second conductive layer portion are in electrical contact and in physical contact with one another in a bottom of the trench.

5. The electrowetting display device of claim 4, wherein the trench is U-shaped in the top view.

6. The electrowetting display device of claim 4, wherein the dielectric layer portion separating the first conductive layer portion and the second conductive layer portion is a first dielectric layer portion, and wherein each electrowetting pixel further includes:
   a second dielectric layer portion at least partially covering the second conductive layer portion; and
   a hydrophobic layer portion at least partially covering the second dielectric layer portion, wherein the hydrophobic layer portion is disposed on sides and the bottom of the trench.

7. The electrowetting display device of claim 4, further comprising an electrolyte solution, and wherein the electrolyte solution at least partially fills the trench at least partly in response to a voltage being applied to the second conductive layer portion.

8. The electrowetting display device of claim 6, wherein the second dielectric layer portion has a first thickness in the region of the electrowetting pixel that is outside of the trench and the second dielectric layer portion has a second thickness in the bottom of the trench, and wherein the first thickness is greater than the second thickness.

9. The electrowetting display device of claim 6, further comprising an oil, and wherein, at least partly in response to a voltage being applied to the second conductive layer portion, a force imparted on the oil is proportional to the voltage divided by a thickness of the second dielectric layer portion.

10. The electrowetting display device of claim 4, further comprising an oil, and wherein the oil forms a layer over the trench at least partly based on no voltage being applied to the second conductor.

11. The electrowetting display device of claim 4, wherein the pixels walls further comprise four pixel wall portions, the four pixel wall portions surrounding an electrowetting pixel, and wherein the trench is adjacent to three of the four pixel wall portions.

12. The electrowetting display device of claim 11, further comprising an oil, wherein the oil collects in a bead adjacent to one of the four pixel wall portions at least partly in response to a voltage being applied to the second conductive layer.

13. The electrowetting display device of claim 4, wherein the second conductive layer portion has a reflectivity configured to reflect light impinging on the electrowetting display device.

14. The electrowetting display device of claim 4, wherein the support plate is a first support plate, and further comprising:
 a second support plate that faces the first support plate; and
 an electrolyte solution that at least partially fills a space between the first and second support plates.

15. The electrowetting display device of claim 13, wherein the second support plate includes a third conductive layer portion, and wherein the second conductive layer portion, the third conductive layer portion, and the electrolyte solution form a capacitor.

16. The electrowetting display device of claim 4, wherein the first conductive layer portion comprises a drain of a thin film transistor (TFT).

17. A method for fabricating at least a portion of an electrowetting display device, the method comprising:
 depositing a first conductive layer on a support plate;
 depositing a first dielectric layer on the conductive layer;
 patterning the first dielectric layer to form a patterned first dielectric layer that includes a trench having a U-shape or an L-shape in a plan view of the first dielectric layer;
 depositing a second conductive layer on the patterned first dielectric layer, wherein the first conductive layer and the second conductive layer are electrically and physically connected to one another in the trench and physically separated from one another by the patterned first dielectric layer outside the trench;
 placing a second dielectric layer having a first thickness on the second conductive layer in the trench;
 placing the second dielectric layer having a second thickness on the second conductive layer outside the trench, wherein the first thickness is less than the second thickness;
 depositing a hydrophobic layer over the patterned first dielectric layer; and
 forming pixel walls on the hydrophobic layer so that at least a portion of the pixel walls are aligned with the trench.

18. The method of claim 17, further comprising:
 at least partially filling the trench with at least one of an electrolyte solution or an oil.

\* \* \* \* \*